Aug. 28, 1951 A. B. WHITE ET AL 2,566,274
EDDY CURRENT HEATING OF ROTORS
Filed June 13, 1947 2 Sheets-Sheet 1

ALLYN B. WHITE
ROBERT B. JACOBS
INVENTORS

BY R. M. Perrins
Allard A. Braddock
ATTORNEYS

Aug. 28, 1951　　　A. B. WHITE ET AL　　　2,566,274
EDDY CURRENT HEATING OF ROTORS
Filed June 13, 1947　　　　　　　　　　　　2 Sheets-Sheet 2
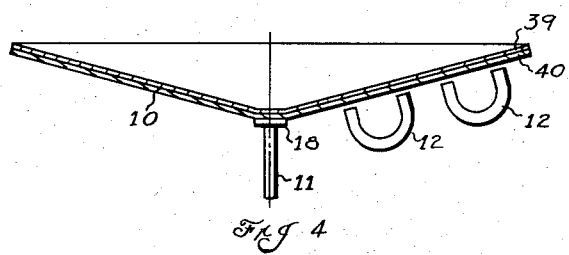
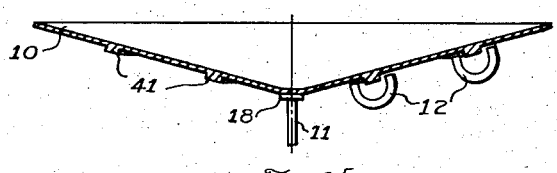
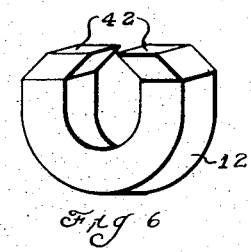
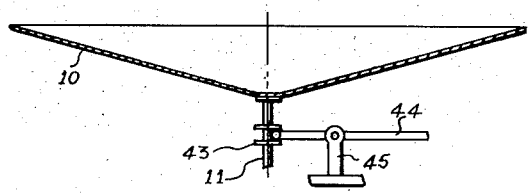
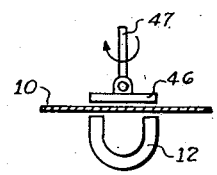
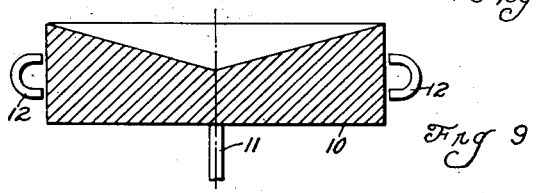
ALLYN B. WHITE &
ROBERT B. JACOBS
INVENTORS
BY *N. M. Perrins*
*Allard A. Braddock*
ATTORNEYS Patented Aug. 28, 1951

2,566,274

UNITED STATES PATENT OFFICE 2,566,274

EDDY CURRENT HEATING OF ROTORS

Allyn B. White, Rochester, N. Y., and Robert B. Jacobs, Chicago, Ill., assignors, by mesne assignments, to Eastman Kodak Company, Rochester, N. Y., a corporation of New Jersey Application June 13, 1947, Serial No. 754,510

5 Claims. (Cl. 202—205)

This invention relates to an improved method and apparatus for generating and controlling heat in a rotating metal member, and in particular to a centrifugal still wherein the rotor is heated by eddy currents induced in said rotor by a magnetic field.

It has long been known that a magnetic field sets up resistance to a conductor moving through it and that the additional force which must be exerted to move the conductor through the field is reflected in a heating effect within the conductor body. This effect—known as the eddy current effect—is best demonstrated by rotating an aluminum disk through the field of a permanent magnet or electromagnet. A resistance torque is set up by the magnetic field and the energy expended overcoming this torque is transferred into heat which warms the aluminum disk to a degree depending on the speed of rotation of the disk and the strength and configuration of the magnetic field.

This eddy current heating is normally an objectionable feature in electrical apparatus as it represents energy dissipation in the form of heat. Our invention contemplates the utilization of this effect as an efficient source of heat. In many applications eddy currents for heating are more efficient than the source of heat normally used. For example, in Hickman Patents 2,308,008; 2,370,464; and 2,379,151 high vacuum centrifugal still apparatus are described wherein the rotors are heated by electrical resistance elements. In such apparatus the big disadvantage is that heat must radiate from the resistance element to the moving member. Therefore, the temperature of the heating element must be considerably above the temperature of the vaporizing surface and this results in significant heat radiation losses, and possible vapor decomposition. With eddy current heating of the rotor radiation losses are held to a minimum.

This invention has for its object to provide improved method and apparatus for generating and controlling heat in a rotating metal member. Another object is to provide improved method and apparatus for generating and controlling heat in a rotor in a vacuum. A further object is to provide improved method and apparatus for generating and controlling heat in a rotor in a vacuum for heating liquids. A still further object is to provide improved method and apparatus for generating and controlling heat in a rotor in a vacuum for vaporizing liquids. Another object is to provide centrifugal distillation apparatus in which the vaporizing surface is heated by eddy currents. A further object is to provide a centrifugal still in which the rotation of the centrifugal surface induces eddy currents which maintain the vaporizing surface at a uniform temperature. A still further object is to improve the state of the art. Other objects will appear hereinafter.

These and other objects are accomplished by our invention which includes a rotatable surface of a material of good electrical conductivity which is heated by eddy currents induced therein by a magnetic field positioned in the path of rotation of said rotatable surface. Our invention also includes means for controlling the magnitude and configuration of the magnetic field within which the rotatable surface moves.

In the following description we have given several of the preferred embodiments of our invention but it is to be understood that these are set forth for the purpose of illustration and not in limitation thereof.

In the accompanying drawings wherein like numbers refer to like parts:

Fig. 4 is a sectional view of a composite rotor with permanent magnets showing a method by which flux leakage may be minimized;

Fig. 5 is a sectional view of a rotor and permanent magnet arrangement showing a method of increasing the magnetic flux through which the rotor moves;

Fig. 6 is a view of one of the magnets, showing extension pieces which may be attached to the poles to give a magnetic field of greater flux density in the vicinity of the rotor;

Fig. 7 shows an alternative method of varying the gap between the magnets and rotor. In this design the magnets (not shown) may be made stationary while the rotor may be raised or lowered;

Fig. 8 shows still another method of controlling the magnetic field through which the rotor rotates;

Fig. 9 is a sectional view of a massive rotor which may be heated by eddy currents;

Figure 1:
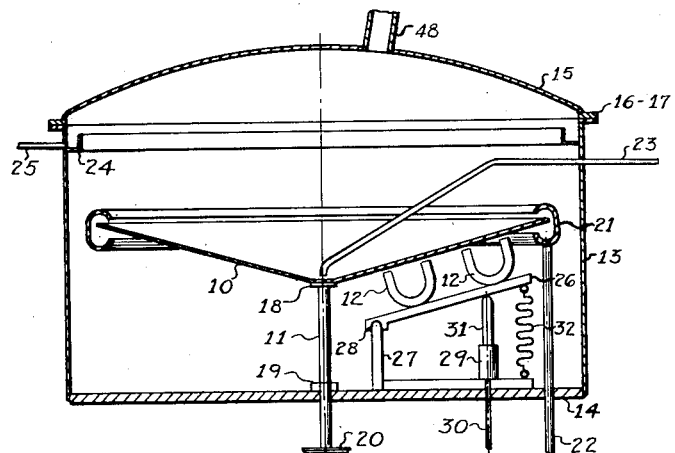
Fig. 1 is a vertical section of a centrifugal still in which the magnetic field is provided by permanent magnets placed underneath the rotor, and heat is controlled by varying the gap between magnets and rotor.
Figure 2:
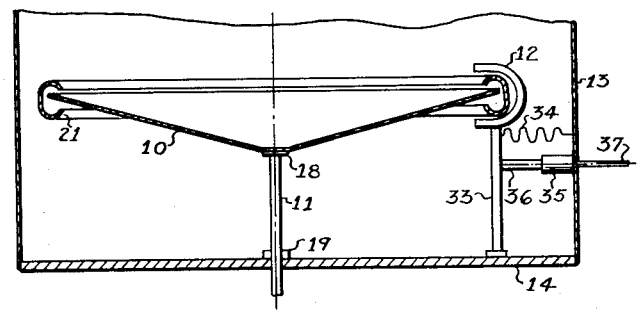
Fig. 2 is a sectional view of a rotor and permanent magnet design in which leakage flux is largely eliminated by placing the rotor between the poles of horseshoe permanent magnets.

Referring to Figs. 1–5 and 7, 9, and 10 numeral 10 designates the rotatable vaporizing surface which is rotated by shaft 11. In Figs. 1, 2, 4-6, 8, 9, and 10 numerals 12 designate permanent magnets which set up magnetic fields through which rotor 10 moves. For clarity magnets 12 are shown so that the observer sees the crescent in the drawings. In Figs. 2 and 5 this is the correct view for actual operation but in Figs. 1, 4, 8, 9 and 10 magnets 12 are preferably rotated 90° in actual operation. We have discovered that the heating effect is enhanced if the poles of the magnets are parallel to the direction of rotation of rotor 10.

In Fig. 1 numeral 13 designates a cylindrical still casing provided with an integral baseplate 14 and a removable top plate 15 with which it makes a gas-tight contact by means of flange 16 and gasket 17. Top plate 15 is the condensing surface. Attached to rotor 10 is flange 18 to which is attached shaft 11. Shaft 11 is housed in gas-tight bearing 19 and is provided with a driving pulley 20. Numeral 21 designates an annular gutter which surrounds the periphery of rotor 10 to which gutter is connected the withdrawal conduit 22. Numeral 23 indicates a conduit for introducing distilland onto the approximate center of rotor 10. Numeral 24 designates an annular channel integral with the upper inside wall of casing 13. Liquid collected in channel 24 is withdrawn by way of conduit 25. Numeral 26 designates an arm on which one or a plurality of permanent magnets may be rigidly fastened. For purposes of illustration only one arm is shown but more than one may be used. Numeral 27 designates a member which is fixedly attached to baseplate 14. Numeral 28 designates a pivot or hinge which connects members 27 and 26. Numeral 29 designates a cylinder into which oil may be pumped through tube 30 to force upward shaft 31, which impinges on member 26, thus closing the gap between magnets 12 and rotor 10. Numeral 32 designates a coil spring in tension which serves to enlarge the gap between rotor 10 and magnets 12 when the oil pressure acting on cylinder 29 is decreased. Numeral 48 designates an evacuating conduit to which vacuum pumps (not shown) may be connected when it is desired to operate as a still at less than atmospheric pressure.

In Fig. 2 numeral 33 designates a vertical member mounted so that it hinges on baseplate 14. At the upper end of member 33 horseshoe magnet 12 is rigidly connected. Spiral tension spring 34 extends horizontally from the upper part of member 33 to still casing 13. Cylinder 35 is mounted on still casing 13. Shaft 36 extends from cylinder 35 to member 33 supporting horseshoe magnet 12. Tube 37 leads from cylinder 35 outside the casing. Oil pressure exerted through tube 37 on cylinder 35 actuates shaft 36 against member 33 and in combination with tension spring 34 acts to control horseshoe magnet 12.

Figure 3:
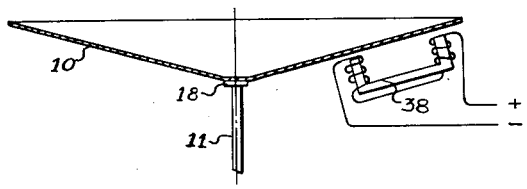
Fig. 3 is a sectional view of a rotor and magnets in which eddy currents are induced by electromagnets.

Referring to Fig. 3 the magnetic field through which rotor 10 moves is formed by electromagnet 38. Heat supplied to the vaporizing surface is controlled by varying the exciting current flowing in the electromagnet. Referring to Fig. 4 numeral 39 designates a portion of the rotor constructed of a magnetic metal and numeral 40 designates a portion of the rotor composed of material of high electrical conductivity.

Referring to Fig. 5 rotor 10 is designed with concentric ridges 41 which act to make maximum use of the magnetic flux.

Fig. 6 illustrates a method of increasing the flux density of that part of the magnetic field in which the rotor moves. Pole pieces 42 are attached to magnet 12. These pole pieces must be constructed of a magnetic material and may be a continuation of the magnet itself. They then have the property of concentrating the lines of magnetic flux in the path of rotor 10.

Fig. 7 illustrates a method of controlling the magnetic field intercepting the rotating member. Collar 43 on shaft 11 is utilized to raise or lower rotor 10 by means of lever arm 44 on fulcrum support 45, thus changing the magnet-rotor spacing.

Fig. 8 illustrates still another method of controlling the strength of the magnetic field. Numeral 46 designates a bar composed of magnetic material which is placed so that it is on one side of rotor 10 while magnet 12 is on the other side. Bar 46 acts to decrease the reluctance of the magnetic path so that more flux is cut by the rotation of rotor 10. This bar also concentrates the lines of magnetic flux into a smaller portion of the rotor. Bar 46 is attached to shaft 47 which may be turned to lessen the number of lines of magnetic flux which pass through rotor 10. Alternatively, bar 46 could be moved by shaft 47 to a different location in order to change the flux conditions.

Fig. 9 shows a type of rotor that will have a very uniform surface temperature due to massive construction.

Figure 10:
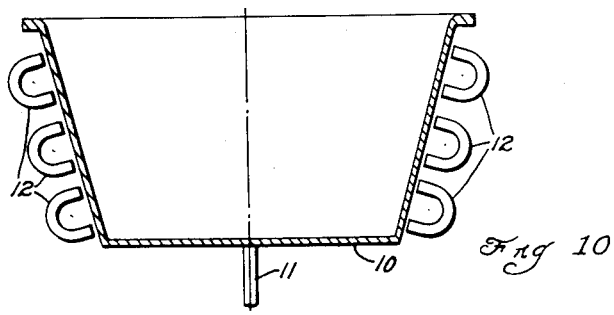
Fig. 10 is a sectional view of a rotor of the type used in large installations.

Fig. 10 shows a rotor of a type used in large installations. This design has been used successfully in sizes up to a diameter of five feet across the top of the rotor.

In operating the apparatus illustrated in Fig. 1 shaft 11 is rotated at the desired speed. The gap between magnets 12 and rotor 10 is adjusted by hydraulic pressure so that the amount of heat supplied maintains the proper vaporizing surface temperature. Distilland is introduced through conduit 23 and vaporization takes place upon the hot surface of rotor 10. If the air gap is kept constant increasing the speed of the rotor will increase the surface temperature. If the rate of rotation of the rotor is kept constant, decreasing the gap increases the magnetic flux through the rotor to give greater heating of rotor metal. If the magnetic field is created by an electromagnet as illustrated in Fig. 3 the air gap and rate of rotation may be kept constant and the magnetic field controlled by changing the current flowing through the magnetic coil.

Our invention is of particular advantage where it is desired to heat fluids within a vacuum such as is encountered in high-vacuum unobstructed-path distillation which is carried out at a pressure of less than approximately 0.1 mm. of mercury. The apparatus of Fig. 1 may be evacuated to a pressure of less than approximately 0.1 mm. of mercury through vacuum pumps (not shown) attached to evacuating conduit 48, and it then becomes a high-vacuum unobstructed-path still. Vaporized material is condensed on cover 15 and collected in channel 24 for withdrawal through conduit 25.

The apparatus of Fig. 1 may be used as a heating device instead of a still. The gap between magnets and rotor is adjusted so that the surface temperature of rotor 10 is maintained below distillation temperature and at some desired intermediate temperature. The liquid to be heated is introduced through conduit 23. Centrifugal action forces it over rotor 10 to gutter 21 from which it is withdrawn by conduit 22. This process very quickly brings the liquid up to any desired temperature and local overheating is avoided.

With the permanent magnet design of Figs. 1, 2, 4, 5, 8, 9, and 10 we prefer to use magnets which create a strong external magnetic field of high flux density. We have found that satisfactory magnets may be composed of dispersion hardening alloys such as are described on page 9 and following of circular of the National Bureau of Standards C448 entitled Permanent Magnets, by Raymond L. Sanford, issued August 10, 1944. With the design of Fig. 1 we have generated as much as 250 watts of heat from a 1-lb. magnet with a 14 inch diameter aluminum rotor operated at 1750 R. P. M. Magnets of lower strength may be used and any magnet, however weak, will have some heating effect.

The number of magnets used and the type of control depends on the operating requirements. One large magnet may have the same heating effect as a plurality of smaller ones. We have observed that the magnetic field occupies sufficient space to insure uniform rotor temperature even though a small number of magnets is used.

We have discovered that the heating effect of the magnets depends upon the weight used. For the strongest magnets we have achieved a heating effect of 250 watts per pound at a rotor speed of 1750 R. P. M. With seven magnets weighing a total of 2 pounds we have attained surface temperature of 300° C. on a 14" rotor rotating at 1750 R. P. M.

The speed of rotation of the rotor is usually fixed and this necessitates regulating the rotor temperature by changing the magnetic field, such as by changing the gap between the rotor and magnets. Fig. 1 shows a simple method by which this is achieved. The oil pressure in cylinder 28 is controlled by an external plunger (not shown) operating on line 30. Forcing the external plunger actuates shaft 31 and raises member 26, closing the gap between rotor 10 and magnets 12. Releasing the plunger enables tension spring 32 to pull member 26 away from rotor 10 thus widening the gap between rotor 10 and magnets 12. In the design of Fig. 2 magnetic flux is more fully utilized by having the two poles of the magnets straddle rotor 10.

In Fig. 3 the magnetic field is provided by electromagnets. Where the installation is under high vacuum the dissipation of heat from the electromagnets is very slow and the magnet must be cooled.

Fig. 4 shows a rotor of composite construction. Rotors constructed of metals of high electrical conductivity such as aluminum, copper, and silver are more easily heated by eddy currents. We have utilized the fact that if a disk of aluminum or similar conducting metal is placed between the magnets and a disk of iron or similar magnetic material, the magnetic disk increases and concentrates the magnetic field through the rotor, thus increasing the heating effect.

Fig. 5 shows another method of increasing the effectiveness of the magnets. Rotor 10 is designed with concentric ridges 41 which rotate between the poles of the horseshoe permanent magnets. The flux passes through these ridges giving a more pronounced heating effect.

Fig. 6 demonstrates a method of improving the effectiveness of the magnets. The pole pieces are extensions of the magnet which need not be constructed of the same material as the magnet but which must be of magnetic material, such as iron. These pieces extend upward toward one another at an angle of about 45°. They serve to concentrate the lines of magnetic flux with minimum leakage so that more of them pass through a small part of the rotor. If the gap between the rotor and magnets is small the magnetic field is concentrated by having a small space between poles but if the gap is large best performance is obtained when greater space is left between the poles. If the pole ends are close together the magnetic field is concentrated immediately beyond the pole ends and a large gap between magnet and rotor allows for considerable leakage flux.

In Fig. 7 the magnets (not shown) are fixedly attached to the body of the apparatus in a position immediately adjacent to the rotor. The lever arm is then used to raise or lower the rotor to control the strength and size of the magnetic field through the rotor.

In Fig. 8 the bar of magnetic material above the rotor concentrates the magnetic flux in a manner similar to the design illustrated in Fig. 4. Any control means which moves this bar to a position where it concentrates less magnetic flux will enable the rotor to operate at a lower temperature. Since the magnetic bar itself has no tendency to heat up it may form part of a condensing surface.

Table I shows the effect on the heat generated of changing the gap between rotor and magnets. The rotor used was made of aluminum ¼" thick by 14¾" diameter. The rate of rotation was 1750 R. P. M.

*Table I*

| Gap | Heating Effect |
|---|---|
| Inches | Watts |
| ¹⁄₃₂ | 200 |
| ¹⁄₁₆ | 185 |
| ⅛ | 150 |
| ¼ | 115 |
| ½ | 90 |

An electromagnet of constant strength was used in securing the above data.

Table II shows the effect of velocity on optimum rotor thickness.

*Table II*

| Rotor Velocity | Radius at Magnet Position | Linear Velocity at Magnet | Rotor Thickness | Heating Effect |
|---|---|---|---|---|
| R. P. M. | Inches | Ft./sec. | Inches | Watts |
| 840 | 6 | 44 | ¹⁄₁₆ | 80 |
| 840 | 6 | 44 | ⅛ | 120 |
| 840 | 6 | 44 | ¹ ¼ | 125 |
| 840 | 6 | 44 | ½ | 115 |
| 1,490 | 6 | 78 | ¹⁄₁₆ | 180 |
| 1,490 | 6 | 78 | ¹ ⅛ | 290 |
| 1,490 | 6 | 78 | ¼ | 270 |
| 1,750 | 4¾ | 72.5 | ¹⁄₁₆ | 155 |
| 1,750 | 4¾ | 72.5 | ¹ ⅛ | 160 |
| 1,750 | 4¾ | 72.5 | ¼ | 140 |
| 1,750 | 4¾ | 72.5 | ½ | 100 |
| 1,750 | 4¾ | 72.5 | 1 | 95 |
| 2,540 | 6 | 105 | ¹ ¹⁄₁₆ | 610 |
| 2,540 | 6 | 105 | ⅛ | 520 |
| 2,540 | 6 | 105 | ¼ | 410 |

¹ Indicates approximate optimum thickness.

The test from which the above data are taken was run with aluminum rotors of 14¾" diameter. An electromagnet of constant strength was used in securing the above data and the gap between rotor and magnet was constant.

The heating effect of the eddy currents depends on the number of lines of magnetic flux being cut per unit of time and the distribution of these lines in the rotor. Rotor characteristics which affect this are the diameter and thickness of the rotor, the electrical conductivity of the material from which the rotor is made, and rate at which the rotor is rotating through the magnetic field. Factors which affect the strength of the magnetic field are the design of the magnets, the material from which the magnets are constructed, the degree of magnetization, the gap between the magnets and rotor, the configuration of the magnets with respect to the rotor, and the presence or absence of flux directing materials in the vicinity of the magnetic field. It is obvious that there may be variations in any of the above factors without departing from the scope of our invention.

What we claim is:

1. Centrifugal vacuum distillation apparatus comprising an enclosed still chamber, means for evacuating said chamber, a generally conical metal rotor rotatably mounted in said chamber, the concave surface of said rotor being a vaporizing surface, means for introducing distilland onto said concave surface of said conical rotor, means for rotating said rotor at a speed effective to centrifugally move distilland across said rotor, stationary condensing means separated from said rotor by substantially unobstructed space, and a plurality of stationary magnets disposed in said chamber substantially adjacent to said rotor, the poles of said magnets being disposed substantially adjacent to a surface of said conical rotor other than said vaporizing surface, said rotor being disposed in the magnetic field of said magnets and being arranged for cutting the lines of magnetic force of said magnets during rotation of said rotor, said magnets constituting essentially the sole means for heating said rotor.

2. Centrifugal vacuum distillation apparatus comprising an enclosed still chamber, means for evacuating said chamber, a generally conical metal rotor rotatably mounted in said chamber, the concave surface of said rotor being a vaporizing surface, means for introducing distilland onto said concave surface of said conical rotor, means for rotating said rotor at a speed effective to centrifugally move distilland across said rotor, stationary condensing means separated from said rotor by substantially unobstructed space, a plurality of stationary magnets disposed in said chamber substantially adjacent to said rotor, the poles of said magnets being disposed substantially adjacent to a surface of said conical rotor other than said vaporizing surface, said rotor being disposed in the magnetic field of said magnets and being arranged for cutting the lines of magnetic force of said magnets during rotation of said rotor, said magnets constituting essentially the sole means for heating said rotor, and adjusting means operable from outside said chamber for moving said magnets toward and away from said rotor.

3. Centrifugal vacuum distillation apparatus comprising an enclosed still chamber, means for evacuating said chamber, a generally conical metal rotor rotatably mounted in said chamber, said rotor having an upwardly directed concave vaporizing surface, means for introducing distilland onto a central zone of said vaporizing surface of said rotor, means for rotating said rotor at a speed effective to centrifugally move the distilland across said vaporizing surface to the periphery of said rotor, stationary condensing means in said chamber separated from said vaporizing surface by unobstructed space, a plurality of stationary magnets mounted in said chamber below said rotor, the poles of said magnets being disposed substantially adjacent to said rotor, said rotor being disposed in the magnetic field of said magnets and being arranged for cutting the lines of magnetic force of said magnets during rotation of said rotor, and adjusting means operable from outside said chamber for moving said magnets toward and away from said rotor, said magnets constituting essentially the sole means for heating said rotor.

4. Centrifugal vacuum distillation apparatus comprising an enclosed still chamber, means for evacuating said still chamber to a pressure below 0.1 mm. of mercury; a generally conical metal rotor disposed in said still chamber, said rotor including a generally concave vaporizing surface, means mounting said rotor for rotation within said chamber with said vaporizing surface directed generally upwardly, means for introducing distilland onto a central zone of said vaporizing surface of said rotor, means for rotating said rotor at a speed effective to centrifugally move the distillate across said vaporizing surface to the periphery of said rotor, a stationary annular gutter extending around the periphery of said rotor and being constructed and arranged for collecting undistilled distilland from the periphery of said rotor, stationary condensing means separated from said vaporizing surface by substantially unobstructed space and being constructed and arranged for condensing vapors distilling from said vaporizing surface, and a plurality of stationary magnets mounted in said chamber below said rotor, the poles of said magnets being substantially adjacent to said rotor, said magnets being disposed with the paired poles of each said magnet generally parallel to the path of rotation of said rotor, said rotor being disposed in the magnetic field of said magnets and arranged to cut the lines of magnetic force during rotation of said rotor, said magnets constituting essentially the sole means for heating said rotor.

5. Centrifugal vacuum distillation apparatus comprising an enclosed metal still chamber, means for evacuating said still chamber to a pressure below 0.1 mm. of mercury, a rotatable shaft extending into said chamber through the bottom of said chamber, a generally conical aluminum rotor mounted on said shaft in said chamber, said rotor having a generally upwardly directed concave vaporizing surface, means for introducing distilland onto a central zone of said vaporizing surface, means for rotating said shaft and rotor at a speed effective to centrifugally move distilland across said vaporizing surface from said central zone to the periphery of said rotor, stationary metal condensing means spaced from said rotor within said chamber and separated from said vaporizing surface by substantially unobstructed space, said condensing means being constructed and arranged for condensing vapors distilling from said vaporizing surface, a plurality of stationary magnets mounted in said chamber below said rotor, the poles of said magnets being substantially adjacent to said rotor and generally parallel to the path of rotation of said rotor, said rotor being disposed in the magnetic field of said magnets and being arranged for cutting the lines of magnetic force of said magnets during rotation of said rotor, said magnets constituting essentially the sole means for heating said rotor, and adjusting means extending through a wall of said chamber and operable from outside said chamber, said adjusting means being constructed and arranged for moving said magnets toward and away from said rotor during operation of said apparatus.

ALLYN B. WHITE.
ROBERT B. JACOBS.

REFERENCES CITED

The following references are of record in the file of this patent:

UNITED STATES PATENTS

| Number | Name | Date |
| --- | --- | --- |
| 1,507,686 | Root | Sept. 9, 1924 |
| 1,912,214 | Northrup | May 30, 1933 |
| 2,000,155 | White | May 7, 1935 |
| 2,181,921 | Schlup | Dec. 5, 1939 |
| 2,188,569 | Endsley | Jan. 30, 1940 |
| 2,224,621 | Voorhees | Dec. 10, 1940 |
| 2,308,008 | Hickman | Jan. 12, 1943 |
| 2,313,175 | Scott et al. | Mar. 9, 1943 |